United States Patent [19]

Face, III

[11] Patent Number: 5,012,588

[45] Date of Patent: May 7, 1991

[54] SELF-RECORDING READOUT SYSTEM FOR SURFACE MEASUREMENT DEVICE

[75] Inventor: Samuel A. Face, III, Newport News, Va.

[73] Assignee: Face Construction Technologies, Inc., Norfolk, Va.

[21] Appl. No.: 330,270

[22] Filed: Mar. 29, 1989

[51] Int. Cl.⁵ .................. G01C 9/06; G01B 7/34
[52] U.S. Cl. ........................................ 33/533; 33/366
[58] Field of Search ............... 33/533, 365, 366, 521, 33/285, 286; 73/313, 314

[56] References Cited

U.S. PATENT DOCUMENTS

| | | | |
|---|---|---|---|
| 4,250,750 | 2/1981 | Martinec et al. | 73/313 |
| 4,434,558 | 3/1984 | Face et al. | |
| 4,473,960 | 10/1984 | Face et al. | |
| 4,716,534 | 12/1987 | Baucom et al. | 33/366 |
| 4,718,173 | 1/1988 | Eklund | 33/366 |
| 4,741,207 | 5/1988 | Spangler | 33/521 |
| 4,768,377 | 9/1988 | Habelmann et al. | 73/313 |
| 4,771,549 | 9/1988 | Shelangoskie | 33/533 |
| 4,797,661 | 1/1989 | Wiley | 33/366 |
| 4,890,491 | 1/1990 | Vetter et al. | 73/313 |

Primary Examiner—William A. Cuchlinski, Jr.
Assistant Examiner—C. W. Fulton
Attorney, Agent, or Firm—Fleit, Jacobson, Cohn, Price, Holman & Stern

[57] ABSTRACT

A data processing system associated with a surface flatness measuring device, distinguishes between differential elevation signals respectively generated by an accelerometer type sensor while at rest and in motion. The readout of time-spaced data is thereby limited to those generated while the device is in steady state condition at rest in measuring positions, for collection of accurate data.

6 Claims, 3 Drawing Sheets

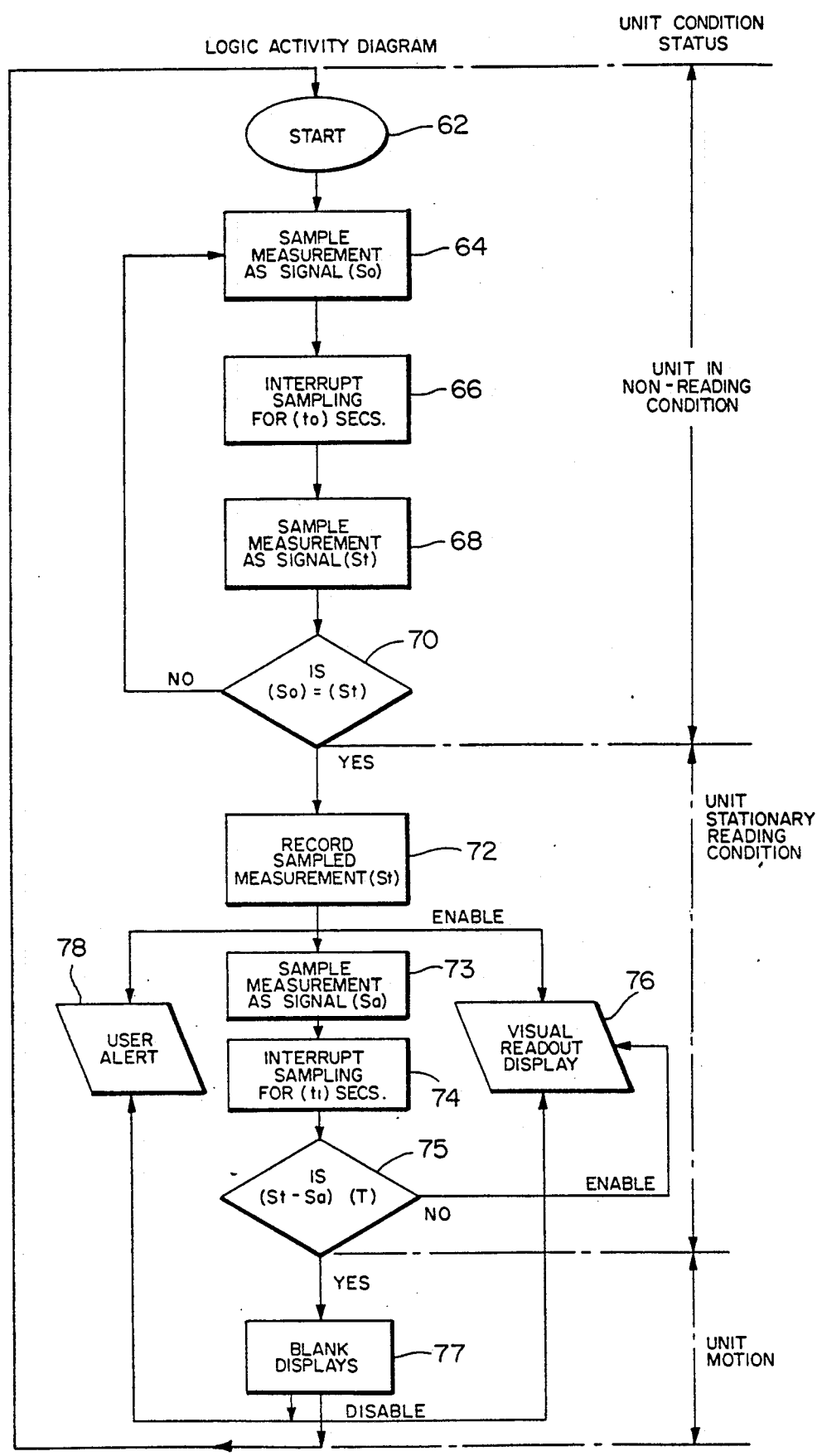

SELF-RECORDING READOUT SYSTEM FOR SURFACE MEASUREMENT DEVICE

BACKGROUND OF THE INVENTION

This invention pertains to the measurement of surface flatness associated with concrete floors. In particular, the present invention relates to the processing of measurement data obtained by surface flatness measuring devices such as those disclosed in prior U.S. Pat. Nos. 4,434,558 and 4,473,960, owned in common with the present application.

As disclosed in the latter mentioned prior U.S. patents, relatively rapid and accurate measurement of floor surface profiles to determine compliance with surface flatness standards in the building industry is made possible by means of a measuring device embodying an inclination sensor. The sensor as indicated in the aforementioned patents is a slope accelerometer from which measurement signals are obtained and processed to produce digital readouts corresponding to differences in inclination between spaced contact points on the surface being measured, engaged by contact pins projecting from the frame on which the sensor is mounted. The frame of the measuring device is accordingly displaced between measuring positions at rest on the surface on which the contact pins simultaneously engage the spaced points thereon. By displacement of the device or "walking" it along the surface being measured, differential elevation readouts from the accelerometer sensor are displayed to provide data from which the surface profile or flatness may be evaluated.

The measuring device is adapted to be displaced by twisting about a vertical axis extending through an elongated handle element extending upwardly from the housing frame, in order to advance or "walk" the device between the measuring positions at rest during which sensor readouts provide signal data. Since the accelerometer type sensor also generates outputs while the device is in motion as a result of its displacement by the twisting action aforementioned, the data collected should be limited to those intervals during which the device is in a steady state condition at rest in its measuring position. Care must therefore be exercised by an operator in observing and recording data displayed in order to achieve data collection accuracy.

It is therefore an important object of the present invention to enable less burdensome use of the aforementioned type of measuring device in the collection of accurate data for analysis of surface flatness.

It is a further object of the present invention in accordance with the preceding object to provide a data processing system associated with the collection of measurement readouts from the aforementioned type of measurement devices which will permit its use in an accurate and automatic fashion, avoiding selective observance and manual recording of data readout displays by the operator.

SUMMARY OF THE INVENTION

In accordance with the present invention, a measuring device of the type disclosed, for example, in prior U.S. Pat. No. 4,473,960, aforementioned, is advanced between positions at rest engaging spaced contact points on a surface to be measured for flatness in a relatively rapid fashion. The measuring device incorporates therewithin data processing apparatus through which automatic recording and collection of data is effected from which accurate measurement of surface flatness is obtained. The inclination sensor associated with the device, interfaced with the data processing apparatus through an attitude data circuit, distinguishes between signals generated by the sensor during intervals while the measurement device is at rest and signals generated while the device is in motion, based on the fact that the signals generated by the sensor during motion vary within a substantially larger range than the signals generated while the device is at rest. In certain embodiments of the invention, the signals generated while the device is at rest are not only read out with opposite signs on the two data measurement displays associated with the device, but an alert in the form of a visual display and/or an audible tone is generated to signify that the steady state condition of rest has been achieved and that the at rest signal has been recorded.

The data processing apparatus carried by the measuring device includes timer controlled data sampling means through which the output of the attitude data circuit aforementioned, to which the accelerometer sensor is connected, is sampled at spaced intervals of time. The signals generated by the accelerometer sensor while the measurement device is at rest remain substantially constant between sampling as compared to the sampled signals generated while the device is in motion as a result of changes in centrifugal force during motion. Such disparity between successively sampled sensor outputs from the attitude data circuit is detected by comparison. When substantial equality between successively sampled signals is detected, one of such sampled signals is recorded and readout on both of the displays as described in the aforementioned U.S. Pat. No. 4,473,960. When there is an abrupt change in the sampled signals as detected by threshold logic, signal readout is prevented. Data recording is thereby limited to signals derived from the sensor while the measurement device is at rest.

BRIEF DESCRIPTION OF THE DRAWING FIGURES

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 5 is a logic activity diagram corresponding to the programming associated with the data processor of the present invention in accordance with one embodiment.

DETAILED DESCRIPTION OF PREFERRED EMBODIMENT

Figure 1:
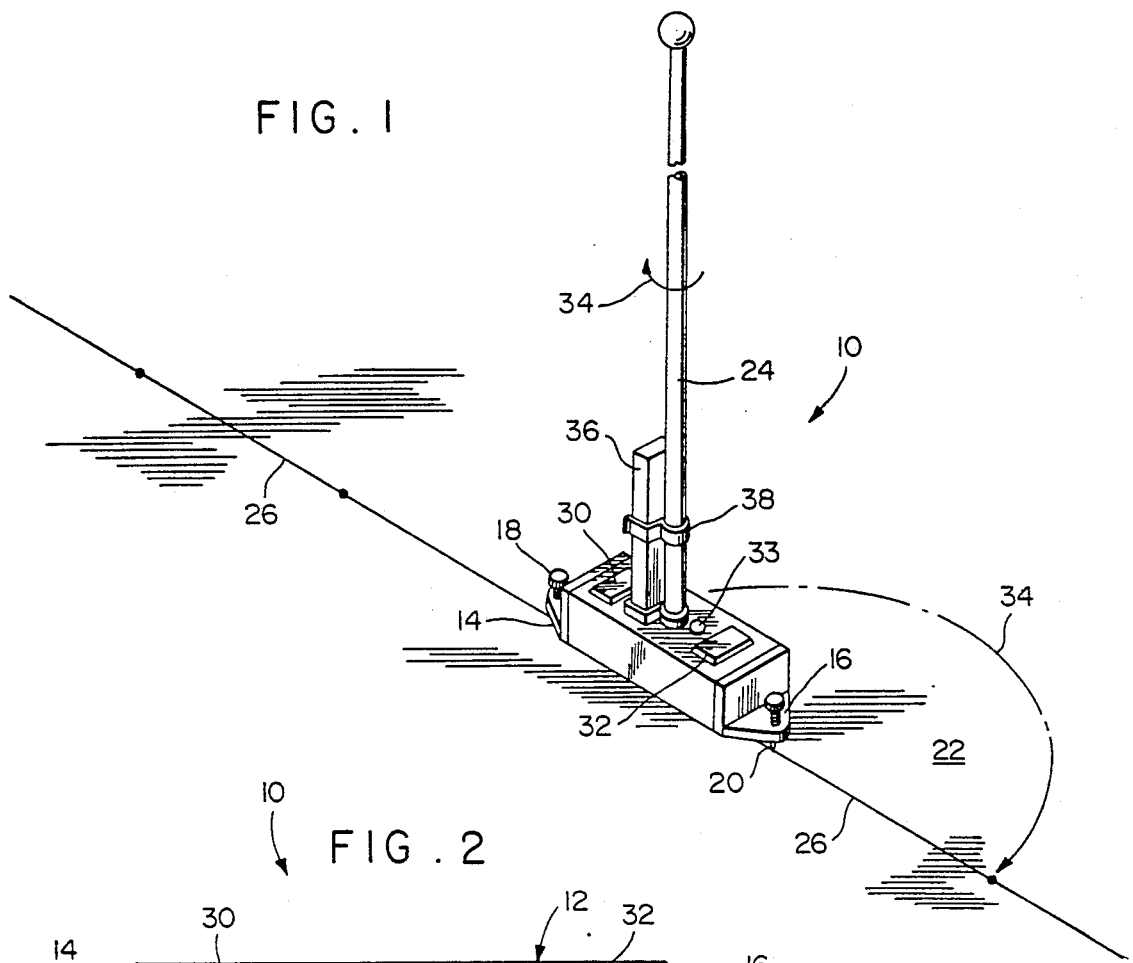
FIG. 1 is a perspective view of a measurement device with the present invention may be associated.
Figure 2:
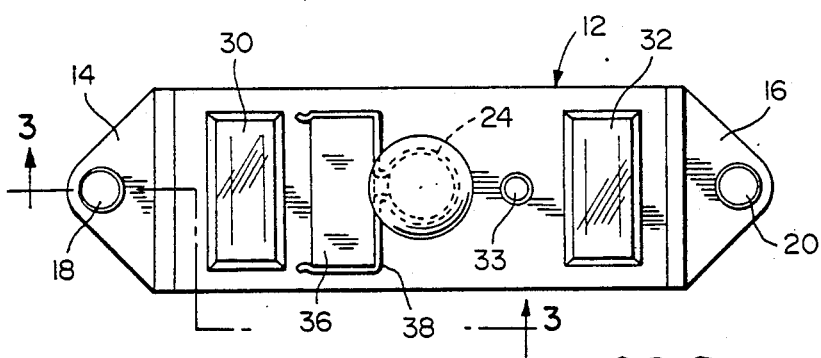
FIG. 2 is a top plan view of the measurement device shown in FIG. 1.
Figure 3:
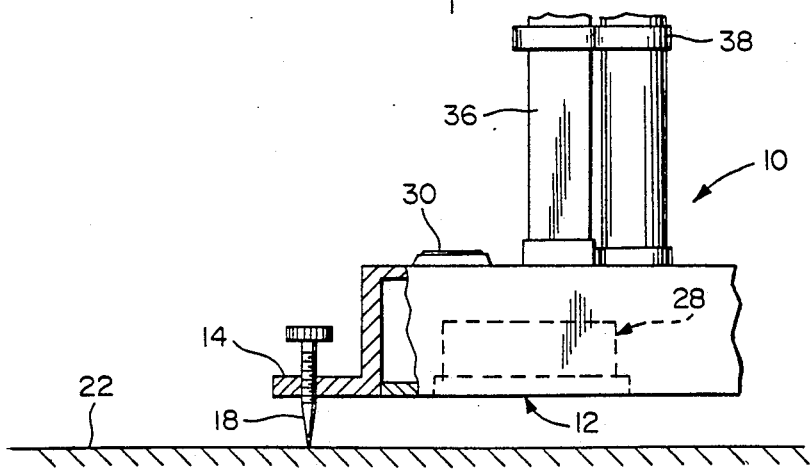
FIG. 3 is a partial side elevation view with portions shown in section of the measurement device taken substantially through a plane indicated by section line 3—3 in FIG. 2.

Referring now to the drawing in detail, FIGS. 1-3 illustrate a surface flatness measuring device generally referred to by reference numeral 10, with which the present invention is associated. The device 10, which is similar to those disclosed in U.S. Pat. Nos. 4,434,558 and 4,473,960 aforementioned (the disclosures of which are incorporated herein by reference), includes an elongated housing frame 12 having end portions 14 and 16, respectively mounting surface contacting elements or pins 18 and 20. The surface contacting pins are adapted to engage spaced contact points on a surface 22 to be measured for flatness. A vertically elongated handle rod 24 is secured to and projects upwardly from the housing frame 12 for rotation thereof through 180° arcs between measurement positions along a line 26 on surface 22 defined by the spaced contact points thereon. An inclination sensor 28 of the accelerometer type (also diagrammed in FIG. 4) is enclosed within the housing frame to generate signals reflecting the difference between elevations of the spaced contact points on surface line 26 simultaneously engaged by the contact pins 18 and 20. LCD types of readout displays 30 and 32 are mounted on the top of frame 12 on either side of the handle rod 24 as shown. Such displays provide visual elevation readouts of opposite sign or polarity. Also, an alerting lamp 33 is mounted on the top of the housing 12 according to one embodiment as illustrated in FIGS. 1 and 2.

When the device 10 is in a steady state condition at rest in a measuring position as shown in FIG. 1, the signal output of sensor 28 therein is substantially constant at a level proportional to the difference in elevation between the contact surface points engaged by contact pins 18 and 20. However, when the device is in motion while being twisted through a 180° arc by the handle rod, as indicated by arrow 34 in FIG. 1, so as to advance or "walk" the device between its measuring positions, centrifugal forces of varying magnitude cause the output level of the sensor to substantially change. Such disparity between the signals generated by the sensor while the device is at rest and in motion is recognized by a data processing system, which includes a microcomputer 36. The microcomputer 36 is plugged into the frame 12 adjacent to the handle rod 24 and is removably secured thereto by a spring clip 38. A keypad and visual display are associated with the computer 36 as will be referred to hereinafter.

Figure 4:
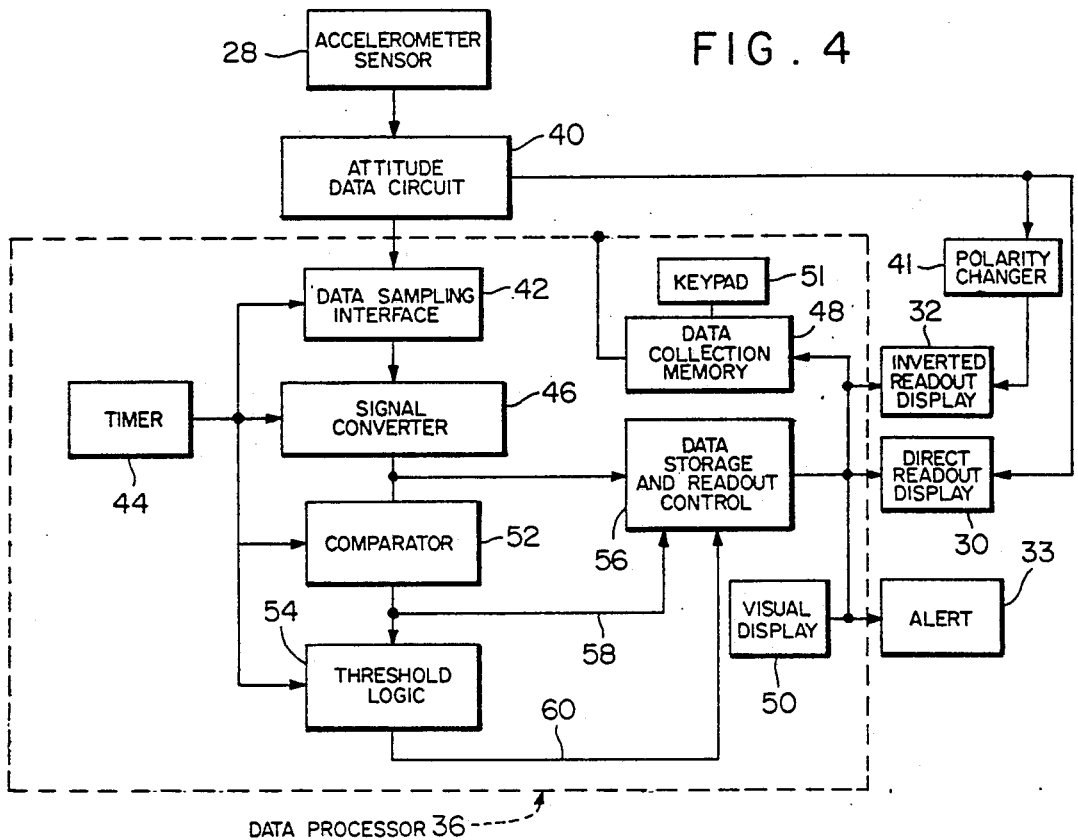
FIG. 4 is a functional block diagram of the data processing system associated with the present invention, incorporated within the measurement device illustrated in FIGS. 1-3.
Figure 6:
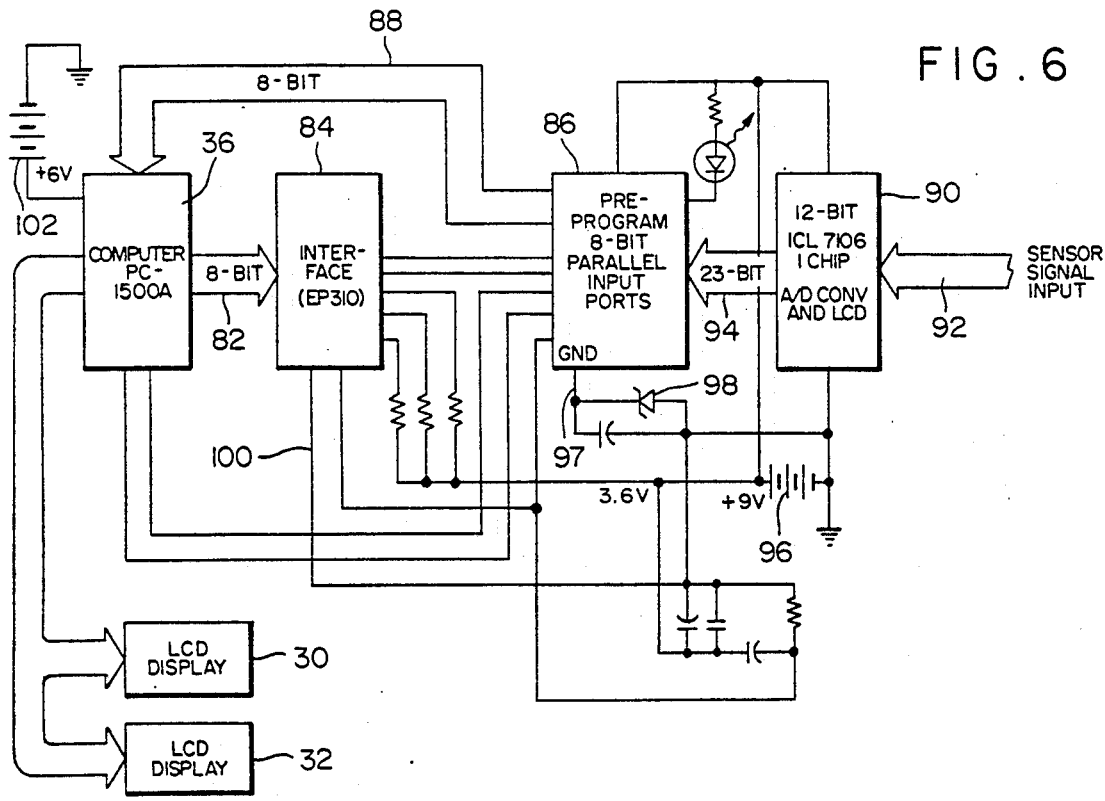
FIG. 6 is a circuit diagram of the data processing system in accordance with an actual embodiment of the invention.

As diagrammed in FIG. 4, the output of sensor 28 is fed through an attitude data circuit 40 to the direct readout display 30 and through a polarity changer 41 to the inverted readout display 32. The signal output is also amplified and otherwise conditioned for data processing by the data circuit 40. The data signal output is then sampled at spaced intervals of time through a data sampling interface 42 under control of a timer 44 associated with the data processing computer 36. A data sampling frequency of 60 Hertz, for example, may be utilized for this purpose. A signal converter 46 transmits the successively sampled data signals to a comparator 52.

When successively sampled data signals being compared are substantially equal, reflecting generation of signals by the sensor 28 while the device 10 is at rest at a measuring position, a readout enabling signal from comparator 52 in line 58 is fed to the data readout control 56. When an abrupt change in the sampled signal exceeds a predetermined threshold, a readout disabling signal in line 60 is fed from threshold logic 54 to the data readout control 56. Thus, enable control signals in line 58 are operative to record sampled signals for storage in data collection memory 48 and to turn on displays 30 and 32 when successively sampled signals are substantially equal while disable control signals in line 60 are operative to disable readout recording and turn off displays 30 and 32 when a sampled signal differs from a preceding recorded signal in excess of a predetermined threshold. While the signal change is below such threshold, readout to displays 30 and 32 is accompanied by illumination of lamp 33 to signify that the device is in its steady state condition at rest. After the desired quantity of data has been recorded in the computer memory 48, as denoted on its display screen 50, the operator may input instructions through keypad 51 of the computer to terminate collection of data. The computer 36 may then be unplugged from the measurement device 10 and interfaced with other data processing equipment for printout of the collected data from its memory 48.

FIG. 5 diagrams the logic activity to which the data processing computer 36 is programmed in accordance with one particular embodiment of the invention. A continuing signal monitoring process is initiated as reflected at program start 62, occasioned by the output of signals from the sensor 28 as aforementioned. When data signal ($S_0$) is sampled as indicated at 64, signal sampling is then interrupted as denoted at 66 for a time interval ($t_0$) before the next signal ($S_t$) is sampled as denoted at 68. Such sampling of signals and comparison of successive signals continues until equality between successive signals ($S_0$) and ($S_t$) occurs as indicated at decision block 70 to complete a non-readout phase of the program. When the non-readout phase is completed, the last sampled data signal ($S_t$) is recorded as denoted at 72 and visual readouts 76 are effected through displays 30 and 32 while the device 10 is at rest. Also, a user alert operation 78 is effected through lamp 33 as aforementioned to signify that a data signal has been recorded while the device is in the stationary reading position at rest. The data signal output ($S_a$) is then sampled as indicated at 73 at fixed time intervals ($t_1$) as denoted at 74. As long as the absolute difference between the recorded signal ($S_t$) and the current signal ($S_a$) as monitored by threshold logic 54 remains below threshold value (T) as determined at decision block 75, visual readouts and user alert as denoted at 76 and 78 remain enabled. If the signal change exceeds (T), then the readout displays and user alert are blanked as denoted at 77 and the program is restarted.

In accordance with one embodiment of the invention, the data processing operations of computer 36 as hereinbefore described with reference to the functional diagram of FIG. 4, are performed by a pre-programmed type of pocket computer such as PC-1500A marketed by Sharp Products. The computer 36 is interfaced by an 8-bit bus 82 and interfacing chip 84, for compatibility, with an 8-bit parallel, input-ported chip assembly 86 that is preprogrammed to transmit sampled data to the computer 36 through 8-bit data bus 88 from a 12-bit analog to digital converter chip 90 operating as the data sampling interface. The data sampling operations are performed at a 60 Hertz frequency derived from the computer timer for signal separation purposes during data processing as aforementioned. The 12-bit sensor signal data is fed by input bus 92 to the chip 90 which outputs a binary coded decimal of its 12-bits through a 23-bit output bus 94 to the 8-bit parallel ports of chip assembly 86 interfaced with the computer for programming it to change alternately sampled signals in sign and drive the displays 30 and 32 through which visual readout of recorded data is effected as aforementioned.

Since the foregoing interfacing for computer 36 operates off a battery 96 directly supplying 9 volts to the chips 86 and 90, the interface ground 97 is maintained at 3.6 volts through a zener diode 98 connected to the negative ground terminal of the 9-volt battery 96. Such interface ground is also connected to the ground 100 for the computer through its interfacing chip 84. Such power connecting arrangement satisfies all requirements of the computer and is compatible with its powering from a 6-volt battery 102.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. In combination with a device displaced between a plurality of measuring positions on a surface to be measured for flatness to generate signals in different level ranges respectively corresponding to the device at rest and during movement between said measuring positions, said device including an accelerometer sensor from which said signals of the different level ranges are generated and display means operatively connected to the device for readout in response to said generated signals; a data processing system comprising means operatively connected to the device for sampling said generated signals at spaced intervals of time, comparator means connected to the sampling means for detecting substantial equality between the signals sampled successively, data storage means for recording the successively sampled signals in response to said detection of substantial equality therebetween and threshold logic means for disabling readout by the display means in response to changes in the successively sampled signals in excess of a predetermined threshold.

2. The combination of claim 1 including alerting means operatively connected to the data processing system for signifying said recording of the sampled signals while the device is in one of the measuring positions at rest.

3. The combination of claim 2 wherein said device includes at least two fixedly spaced contact elements simultaneously engageable with the surface in each of said measuring positions of the device while at rest.

4. In combination with a device displaced between a plurality of measuring positions on a surface to generate signals respectively corresponding to the device at rest and during movement between said measuring positions, and display means operatively connected to the device for readout of said generated signals; a data processing system comprising means operatively connected to the device for sampling said generated signals at spaced intervals of time, comparator means connected to the sampling means for detecting substantial equality between the signals sampled successively, data storage means for storing the successively sampled signals in response to said detection of substantial equality therebetween and logic control means connected to the data storage means for preventing said readout by the display means in response to abrupt change in the generated signals reflecting said movement of the device.

5. In combination with a measurement device displaced between positions at rest, a method of programming readout of signals generated by said device, including the steps of: sampling the generated signals at spaced intervals of time; detecting substantial equality between successively sampled signals reflecting said generation of the signals by the device at said positions at rest; and limiting said readout of the generated signals to the successively sampled signals of substantial equality reflecting measurements effected by the device at the positions of rest.

6. In combination with a measuring device having means engageable at spaced contact points with a surface to be measured for flatness, said device having a surface inclination sensor producing measurement signals and display means for readout of said measurement signals; data processing means operatively interconnecting said sensor and the display means, comprising logic means operatively connected to the sensor for distinguishing between the signals respectively generated while the device is at rest and in motion, and control means operatively connecting the logic means to the display means for preventing said readout therefrom of the measurement signals generated while the device is in motion during collection of flatness data by displacement of the means on the device between measuring positions engaging the spaced contact points on the surface to be measured.

* * * * *